Patented Aug. 25, 1953

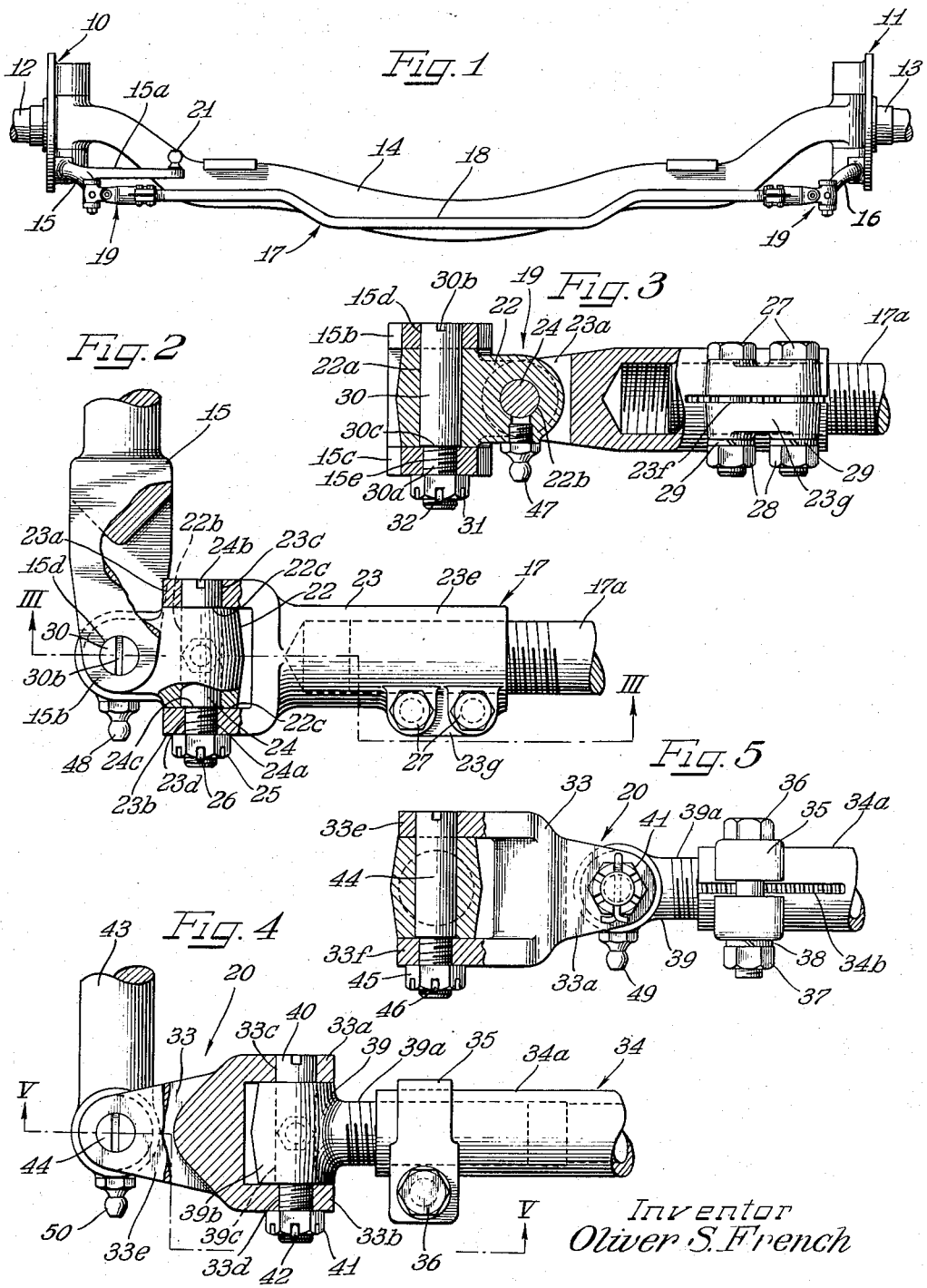

2,650,106

UNITED STATES PATENT OFFICE 2,650,106

STEERING KNUCKLE AND TIE ROD CONNECTION

Oliver S. French, Detroit, Mich., assignor to Thompson Products, Inc., Cleveland, Ohio, a corporation of Ohio Application May 27, 1950, Serial No. 164,708

8 Claims. (Cl. 280—95)

1

This invention relates to joint structures in which a first connecting member is pivotable in a single plane and a second connecting member is pivotable in a second plane at an angle to the plane of rotation of the first connecting member.

More specifically, this invention relates to a joint structure having joint studs at an angle to one another to permit rotation of a first connecting member about one stud in a single plane and tilting of a second connecting member about the other stud in another plane which is at an angle to the plane of rotation of the first connecting member.

According to the present invention, an attaching block or housing joins two connecting members at their ends by means of pinned yoke and tongue tie joints, the pin joining one connecting member to one end of the attaching block being at substantially right angles to the pin joining the other connecting member to the other end of the attaching block. Each yoke and tongue attachment may be accomplished by providing the yoke at the end of the connecting member and the tongue at one end of the attaching block, or vice versa, with the yoke formed at the end of the attaching block and the mating tongue formed at the end of the connecting member. The pivotal connection at each end of the attaching block is accomplished by inserting a pin through mating holes in the yoke and the connecting tongue and by securing the pin in any suitable manner. Thus, it will be seen that a semi-universal joint has been provided which will permit rotation of one connecting member in a single plane while at the same time permitting pivoting of the other connecting member in a single plane substantially perpendicular to the plane of rotation of the first connecting member. It is understood of course, that the planes of rotation of the connecting member may be at any angle, right angles being chosen as most expeditious for some purposes.

Joints of this invention are especially useful in front wheel suspensions for automobiles or trucks which utilize vertical king pins for connecting the front wheel assemblies to an axle assembly. When used as tie rod end joints in such a vertical king pin construction, the joints provide for free pivoting of the tie rod assembly with respect to the steering arms in a horizontal plane while permitting pivoting of the tie rod ends in a vertical plane with respect to each steering arm. This pivoting of the tie rod in a vertical plane serves to take up any errors in

2 alignment between the pin holes in the steering arms, any difference in vertical height between the steering arm bosses which contain the pin holes, and any misalignment due to lack of straightness of the tie rod itself. It can be readily seen that full universal attachment of the tie rod assembly to the steering arm pin joint is neither necessary nor desirable. Such a universal attachment would allow rotation of the tie rod assembly about its own axis, a movement which would perform no useful purpose and which would cause premature wear in the joint assembly in addition to providing a rattling connection.

It is, therefore, an important object of the present invention to provide a joint which permits pivoting of two connecting members attached at their ends in planes which are at an angle to one another.

A further object of this invention is to provide a simple and inexpensive semi-universal joint having pinned yoke and tongue type connections.

Another object of this invention is to provide a joint having an attaching block forming yoke and tongue type connections with connecting members at either end thereof in such a manner that the connecting members are permitted to pivot in planes which are substantially perpendicular.

A specific object is to provide a simple and reliable tie rod end connection for connecting a tie rod to a steering arm in automotive front wheel assemblies utilizing vertical king pins.

On the drawings:

Figure 1 is a fragmentary side elevational view of an automotive front wheel and axle assembly utilizing vertical king pins with a tie rod assembly connected at its end to the steering arms by means of joints according to the present invention;

Figure 2 is a top plan view, partly in section, of an assembled joint structure according to the present invention;

Figure 3 is a side elevational view, partly in section, taken along line III—III of Figure 2;

Figure 4 is a plan view, partly in section, of a second embodiment of a joint structure of this invention; and Figure 5 is a partially sectional view taken along line V—V of Figure 4.

As shown on the drawings:

In Figure 1, front wheel supports 10 and 11 having front wheel spindles 12 and 13 are attached by means of vertical king pins to a front wheel axle 14. Steering arms 15 and 16 are rigidly attached to front wheel supports 10 and 11, respectively. Tie rod assembly 17, having offset center portion 18, pivotally interconnects steering arms 15 and 16. The pivotal connection between each steering arm and tie rod assembly 17 is accomplished through use of one embodiment of the joint construction according to the present invention. Tie rod joint assembly 19, the embodiment illustrated in Figures 2 and 3, is the connecting joint shown in Figure 1. It is understood that a second embodiment 20, as shown in Figures 4 and 5, can be used in place of the assemblies 19.

A second arm 15a integrally attached to steering arm 15 extends horizontally inwardly from the tie rod connecting joint and has a steering fitting 21 securely attached at its end. Steering of the front wheel supports 10 and 11 is accomplished by actuation of steering arm 15 through various connecting means from the steering wheel (not shown) and through the steering fitting 21. Actuation of steering arm 15 moves front wheel support 10 about its vertical king pin and at the same time accomplishes similar movement in front wheel support 11 through tie rod assembly 17 and steering arm 16.

It can be readily seen that all misalignment, whether in the steering arms 15 and 16 or in the tie rod assembly 17, will be compensated for by pivoting of the tie rod assembly 17 in a vertical plane since the steering arm moves in a single plane only. It can also be readily seen that full universal connection of the tie rod assembly 17 to the steering arms 15 and 16 is not only unnecessary but undesirable since any rotation of tie rod assembly 17 about its own axis would serve no useful purpose but would promote rattling of the joint and result in premature wear.

Referring now to Figures 2 and 3, the joint assembly 19 has an attaching block 22 comprising substantially cylindrical ends with axes at right angles to one another. Circular holes 22a and 22b are formed at right angles to one another and are located along the cylindrical axes of the substantially cylindrical outside ends.

A connecting member such as the tie rod assembly 17 has an end fitting 23 with a yoke end comprising a pair of parallel yoke arms 23a and 23b which fit slidably over flat parallel sides 22c of the portion of attaching block 22 which contains a cylindrical hole 22b therethrough. Holes 23c and 23d are formed through yoke arms 23a and 23b, respectively, and have a common axis which coincides with the axis of hole 22b through the attaching block 22. A cylindrical stud pin 24 has a threaded portion 24a at one end and a transverse slot 24b at its other end to receive a screw driver or the like. The pin 24 is inserted, threaded end first, through holes 23c and 22b and is then threadedly inserted into threaded hole 23d until an annular shoulder 24c rests firmly against the inner surface of yoke arm 35b. Sufficient clearance is provided between the wall of hole 22b and pin 24 to allow free pivoting of the attaching block 22 about said pin. Sufficient clearance is also provided between block sides 22c and the inner surfaces of the yoke arms 23a and 23b in order not to unnecessarily impede such pivoting of attaching block 22. Only slight clearance is provided between the wall of hole 23c and the slotted end of pin 24 in order to provide a fairly tight fit but still allow easy insertion of the pin.

In order to prevent pin 24 from becoming loose and possibly falling out, a jam nut 25 is threadedly inserted over the threaded end 24a and jammed tightly against the outer surface of yoke arm 23b. A cotter pin 26 is inserted through a transverse hole through the threaded end 24a and fits in castle slots at the outer end of jam nut 25.

Tie rod end fitting 23 has an internally threaded cylindrical end portion 23e at its end opposite from the yoke arms 23a and 23b. A longitudinal slot 23f is formed through the wall of cylindrical end portion 23e and a pair of bosses 23g is formed one on either side of the slot 23f. Bolts 27 are inserted through holes in the bosses 23g and extend across the slots 23f. The ends of the bolts 27 have nuts 28 thereon with lock washers 29 under said nuts. A threaded end of the tie rod 17 is threadedly inserted into the internally threaded portion 23e. When the desired relationship between the end fitting 23 and the rest of the tie rod construction 17 has been reached, the nuts 28 are tightened down on bolts 27 thereby drawing the walls of the end portion 23e tightly about the threaded end 17a of the tie rod assembly 17. Consequently a very rigid connection is obtained.

The second connecting member such as steering arm 15 is pivotally connected to the other end of attaching block 22 by means of a cylindrical stud pin 30 having a threaded portion 30a at one end thereof and a slot 30b formed at the other end. Pin 30 is assembled with attaching block 22 and steering arm 15 in a manner similar to that used in assembly of pin 24. It is inserted threaded end first through hole 15d in one yoke arm 15b, through hole 22a of attaching block 22, and finally by threadedly inserting the threaded end portion 30a into the threaded hole 15e in the other yoke arm 15c until the annular shoulder 30c rests firmly against the inner surface of this yoke arm. Jam nut 31 and cotter pin 32 are then assembled on the threaded end 30a.

A second embodiment of the present invention is illustrated in Figures 4 and 5. As shown therein, a joint assembly 20 comprises an attaching block 33 which has yoke ends adapted to receive pins at right angles to one another. One such yoke end comprises yoke arms 33a and 33b, yoke arm 33a having hole 33c therethrough and yoke arm 33b having threaded hole 33d therethrough. Tie rod assembly 34 is similar to tie rod assembly 17 but has a differently formed end section 34 at each end which comprises an internally threaded cylindrical portion having a longitudinal slot 34b formed through the wall of the cylinder and extending for the greater part of the threaded length. A split clamp 35 is inserted over the end of cylindrical portion 34a and has a bolt 36 extending across its split portion with nut 37 having lock washer 38 thereunder at the bolt end.

A tie rod end fitting 39 having an externally threaded portion 39a is threadedly inserted into the internally threaded end 34a of tie rod 34. Split clamp 35 is then tightened to insure a non-rotating fit when the fitting 39 is in proper position. At its outer end tie rod fitting 39 has a generally cylindrical knob 39b having its cylindrical axis approximately perpendicular to the longitudinal axis of the tie rod 34. A cylindrical hole 39c is formed along the cylindrical axis of knob 39b. The knob 39b is of such a width as to fit slidably between the yoke arms 33a and 33b of the attaching block 33. Cylindrical pin 40 extends through holes 33c and 39c and is threadedly inserted into threaded hole 33d in a manner similar to that of pins 24 and 30 (Figures 2 and 3). Nut 41 and cotter pin 42 are properly attached to the threaded end of pin 40.

The other end of attaching block 33 has yoke arms 33e and 33f at right angles to yoke arms 33a and 33b. A portion of steering arm 43 is attached between yoke arms 33e and 33f by means of pin 44, nut 45, and cotter pin 46 in the manner described hereinabove.

Means for lubricating the journal sections of the pins 24, 30, 40 and 44 therein comprise standard lubricating fittings 47, 48, 49 and 50 extending into holes in the various bearing connecting portions.

In both embodiments of the inventon described hereinabove, yoke and connecting tongue means, held in rotatable attachment by utilization of cylindrical pins, are provided at either end of an attaching block with the pins extending at an angle to one another. Consequently, the planes of the two mating connecting members are at an angle to one another in providing the desired semi-universal action. It is within the scope of the present invention to provide tongue means at one end of the attaching block with either yoke or tongue means at the other end thereof, or vice versa, so long as the connecting pins are at an angle to one another to provide the semi-universal action described above.

From the above description it will be understood that this invention provides a pin type tie rod joint for vertical kingpin mounted steering assemblies wherein the joint will freely transmit steering motion and will accommodate misalignment of tie rod and steering arm mountings but will not permit rocking of the tie rod about its own axis. The pin joints of this invention are easily installed and are equipped with lubricant fittings for greasing the pins thereof.

It will be understood that modifications and variations may be effected without departing from the scope of the novel concepts of the present invention.

I claim as my invention:

1. A pin type tie rod joint accommodating misalignment of tie rod and steering arm connection points without permitting rotation of the tie rod, comprising an attaching block, yoke means pivotally attaching the tie rod to said attaching block for pivoting of the tie rod in a single vertical plane with respect to said attaching block, and yoke means pivotally attaching the steering arm to said attaching block for pivoting of the attaching block in a horizontal plane.

2. A joint for pivotally connecting a tie rod to a steering arm comprising an attaching block, yoke means pivotally attaching the tie rod to said attaching block for pivoting of the tie rod in a vertical plane with respect to said attaching block, and yoke means pivotally attaching the steering arm to said attaching block for pivoting of the attaching block in a horizontal plane, both of said yoke means comprising a member with substantially parallel arms having a first hole formed transversely through one of said arms coaxial with a second threaded hole formed transversely through the other of said arms, a mating cylindrical hole in said block coaxial with the holes through said yoke arms, a generally cylindrical pin inserted through the first hole in said yoke arm and having a threaded end threadedly inserted into the threaded second hole in said other yoke arm, said cylindrical pin acting as a bearing journal in the cylindrical hole through said block.

3. A joint for pivotally attaching a tie rod to a steering arm, comprising an attaching block having end portions, each of said end portions having a pair of flat, substantially parallel faces at an angle to the pair of faces at the other end portion, the tie rod and the steering arm having yoke ends arranged to fit slidably over the pair of faces on each attaching block end portion, and means pivotally attaching said yoke ends to said attaching block end portions with the attaching block pivotal in a horizontal plane with respect to the steering arm and with the tie rod pivotal in a vertical plane with respect to said block.

4. A joint for pivotally connecting a tie rod to a steering arm comprising an attaching block having end portions, each of said end portions having a pair of flat, substantially parallel faces at an angle to the pair of faces at the other end portion, the tie rod and the steering arm having yoke ends arranged to fit slidably over the pair of faces on each attaching block end portion, the end portions of said attaching block and said yoke ends having coaxial holes formed therethrough, said holes being perpendicular to the pair of faces on each end portion, and cylindrical pins inserted through said holes to act as bearing journals for pivotally attaching said yoke ends to said attaching block end portions with the attaching block pivotal in a generally horizontal plane with respect to the steering arm and with the tie rod pivotal in a generaly vertical plane with respect to said attaching block.

5. A joint for pivotally connecting a tie rod to a steering arm comprising an attaching block formed with two generally cylindrical portions integrally attached at the sides thereof and having their cylindrical axes at substantially right angles, each of said cylindrical portions having a cylindrical hole formed along the cylindrical axis thereof, said tie rod and said steering arm having yoke ends with substantially parallel arms arranged to fit slidably over the ends of said cylindrical portions, one arm of each of said yoke ends having a first hole formed transversely therethrough and the other arm having a second coaxial threaded hole therethrough, a generally cylindrical pin inserted through the first hole in each of said yoke arms and having a threaded end threadedly inserted into the threaded hole in said other yoke arm, said cylindrical pins acting as bearing journals in the cylindrical holes through said cylindrical portions to allow pivoting of the tie rod in a single vertical plane with respect to said attaching block and to allow pivoting of the attaching block in a generally horizontal plane with respect to the steering arm.

6. A joint for pivotally connecting a tie rod to a steering arm comprising an attaching block having yoke end portions, each of said yoke end portions having a pair of substantially parallel yoke arms with faces at an angle to the faces of the yoke arms at the other end portion, the tie rod and the steering arm having end portions comprising a pair of flat substantially parallel faces, said tie rod and steering arm end portions being arranged to fit slidably between the arms of said attaching block yoke end portions, and means for pivotally attaching said attaching block yoke end portions to said connecting member end portions with the attaching block pivotal in a generally horizontal plane with respect to the steering arm and with the tie rod pivotal in a generally vertical plane with respect to said attaching block.

7. A joint for pivotally connecting a tie rod to a steering arm comprising an attaching block having yoke end portions, each of said yoke end portions having a pair of substantially parallel yoke arms with faces at an angle to the faces of the yoke arms formed at the other end portion, the tie rod and the steering arm having end portions each with a pair of flat, substantially parallel faces, said tie rod and steering arm end portions being arranged to fit slidably between the arms of said attaching block yoke end portions, the tie rod and the steering arm and said attaching block having coaxial holes formed through each tie rod and steering arm end portion and the yoke arms of the attaching block end portions, said holes being perpendicular to the pair of faces on each tie rod and steering arm end portion, and cylindrical pins inserted through said holes to act as bearing journals for pivotally attaching said tie rod and steering arm end portions to said attaching block yoke end portions with the attaching block pivotal in a generally horizontal plane with respect to the steering arm and with the tie rod pivotal in a generally vertical plane with respect to said attaching block.

8. A joint for pivotally connecting a tie rod to a steering arm comprising an attaching block, a pair of yoke arms with substantially parallel inner faces formed at each end of said attaching block, the pair of yoke arms at one end of said attaching block having inner faces at right angles to the inner faces of the pair of yoke arms at the other end thereof, each of said pair of yoke arms having a first hole through one arm thereof with its axis perpendicular to the inner face of the arm and a coaxial internally threaded second hole through the other arm thereof, the tie rod and the steering arm having generally cylindrical end portions with the cylindrical axis of each of said end portions perpendicular to the longitudinal axis of the connecting member, said cylindrical end portions being adapted to fit slidably between the inner faces of said yoke arms, each of said end portions having a cylindrical hole along the cylindrical axis thereof, a generally cylindrical pin inserted through the first hole in one arm of each pair of said yoke arms and having a threaded end threadedly inserted into the threaded second hole in said other yoke arm, said cylindrical pins acting as bearing journals in the cylindrical holes through the cylindrical portions of the ends to allow pivoting of the tie rod in a single vertical plane with respect to said attaching block and to allow pivotal movement of the attaching block relative to said steering arm in a generally horizontal plane.

OLIVER S. FRENCH.

References Cited in the file of this patent
UNITED STATES PATENTS

| Number | Name | Date |
| --- | --- | --- |
| 801,521 | Haas | Oct. 10, 1905 |
| 838,940 | Bentley | Dec. 18, 1906 |
| 1,439,788 | Beechler | Dec. 26, 1922 |
| 1,653,061 | Pedersen et al. | Dec. 20, 1927 |
| 1,826,113 | Winsor | Oct. 6, 1931 |
| 2,175,429 | Chayne | Oct. 10, 1939 |
| 2,464,982 | Leighton | Mar. 27, 1949 |